Dec. 15, 1964     J. E. QUINLIVAN     3,161,878
APPARATUS AND METHOD FOR TESTING RADIO FUSES
Filed March 7, 1961
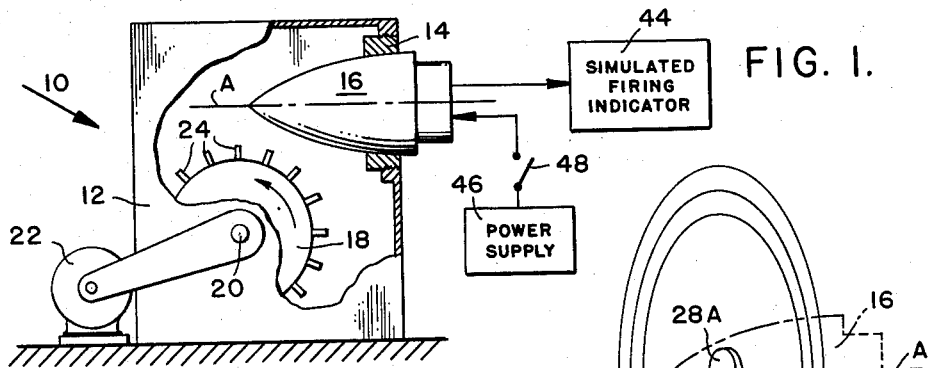
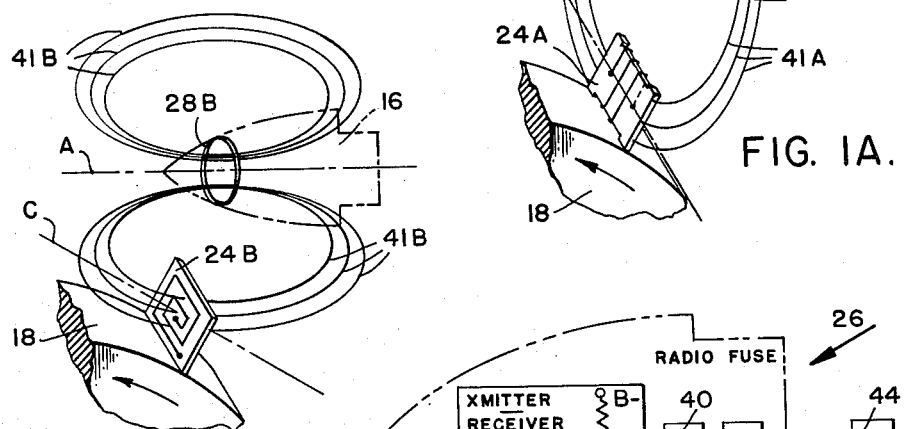
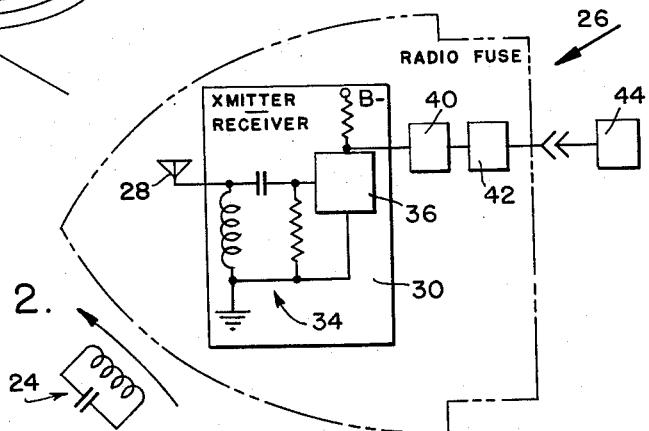
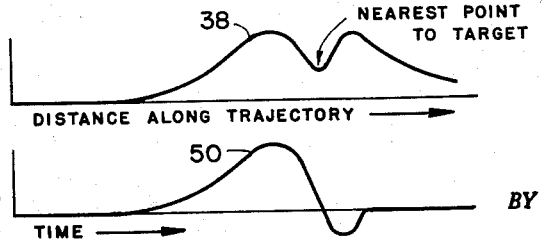
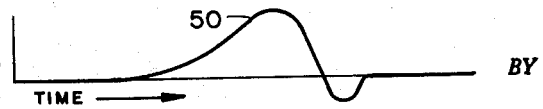
INVENTOR.
JOHN E. QUINLIVAN
BY
ATTORNEY.

3,161,878
APPARATUS AND METHOD FOR TESTING RADIO FUSES
John E. Quinlivan, 914 13th St., Bremerton, Wash.
Filed Mar. 7, 1961, Ser. No. 94,087
8 Claims. (Cl. 343—17.7)
(Granted under Title 35, U.S. Code (1952), sec. 266)

The invention described herein may be manufactured and used by or for the United States of America for governmental purposes without the payment of any royalties thereon or therefor.

This invention relates to apparatus and methods for testing radio fuses of the type that fire an explosive projectile in response to radio energy reflected from a target.

Radio fuses of the type referred to comprise a small high frequency radio transmitting and receiving unit which operates at a predetermined carrier frequency, and a firing circuit which is operably responsive to the radio unit to initiate an electrical signal to explode the projectile. It is desirable to test such fuses, both at the time of manufacture and at periodic intervals when stored for prolonged periods, to determine whether the carrier frequency is within acceptable tolerance limits and whether the firing circuit is functioning properly.

Ordnance storage facilities frequency stockpile radio fuses having different frequencies of operation and having different antenna lobe patterns. It will be apparent, therefore, that it is further desirable to have testing apparatus which is capable of accommodating fuses having such diverse operating characteritics.

It is therefore an object of the present invention to provide novel apparatus for testing the carrier frequency and for functionally testing the firing circuit of a radio fuse of the type referred to.

Another object is to provide apparatus in accordance with the preceding objective which is capable of accommodating fuses having different frequencies of operation.

Another object is to provide apparatus in accordance with the preceding object which is capable of accommodating fuses having different antenna lobe patterns.

Other objects and many of the attendant advantages of this invention will be readily appreciated as the same becomes better understood by reference to the following detailed description when considered in connection with the accompanying drawings wherein:

FIG. 1 is a partially cut away side elevation of one form of the invention, with certain associated elements shown schematically;

FIG. 1A is a diagrammatic view of a detail of FIG. 1 wherein the radio fuse antenna has a given lobe pattern;

FIG. 1B is a diagrammatic view of a detail of FIG. 1 wherein the radio fuse antenna has a different lobe pattern;

FIG. 2 is a schematic, in somewhat simplified form, of one form of radio fuse;

FIG. 3 shows the waveform of a signal received and detected by the device of FIG. 2 during actual operation against a target; and FIG. 4 shows the waveform of a simulated signal produced in accordance with the present invention.

Referring to the drawing and in particular to FIG. 1, radio fuse test apparatus 10 comprises a box 12 which is provided with an opening 14 adapted to removably receive and support a projectile nose section 16 having an axis A and containing a radio fuse. A wheel 18 of Lucite, or other low permeability material, has a central spindle 20 which is journally mounted between opposite walls of the box with the spindle axis disposed in transverse relation to axis A of the projectile. An end of spindle 20 extends through the wall of the box and is driven in rotation by a motor 22. Apparatus 10 may test any desired number of radio fuses having different antenna lobe pattern and carrier frequency characteristics, and to this end is provided a plurality of electrically open tuned coils 24, which are angularly spaced about the periphery of wheel 18. For each of the different fuses there is a corresponding matching coil, chosen in a manner as will become apparent, to cooperate with it.

Contained within projectile nose 16 is a conventional Doppler frequency type radio fuse 26 for use against a point target, which fuse comprises an antenna 28 and a superregenerative heterodyning oscillating detector type of circuit 30 for detecting the Doppler frequency component of radio energy reflected from a target. Circuit 30 comprises a resonant grid circuit 34 closely coupled to the antenna and a conventional heterodyning detector circuit 36 including a tube which is operated nonlinearly. In accordance with well known principles, this circuit operates supergeneratively to transmit radio energy at a carrier frequency equal to the resonant frequency of its grid circuit, and operates as a heterodyning oscillating detector to detect the Doppler frequency component of the radio energy reflected from a target. Radio fuse 26 utilizes the well known phenomenon that when the fuse follows a trajectory which passes in the proximity of a point target, the intensity of Doppler frequency energy at the output of tube 36 varies in accordance with solid line curve 38 of the graph of FIG. 3, increasing as the fuse approaches the target due to the increase of reflected radio energy received by the antenna, and then sharply declining as the projectile passes the target, due to the decrease in relative velocity between the fuse and the target along the line of sight between the projectile and the point target, and reaching a minimum value at the closest point to the target. This Doppler signal is separated by a band pass amplifier 40 and passed to a suitable selective circuit 42 for initiating a firing signal at a desired point along the curve to thereby explode the projectile at an advantageous position with respect to the target, as for example by sensing the sharp decline in intensity taking place just before the projectile passes the target.

In matching coils 24 to the distinctive antenna lobe pattern of the different fused varieties, the coil is selected to have a configuration and disposition relative to the magnetic lines of force of the lobe pattern to permit electromagnetic coupling between the coil and the antenna. For example, one common type of antenna comprises a solid concentric radiataing element 28A, FIG. 1A, disposed transverse to projectile axis A and so fed that it generates a lobe pattern having magnetic lines of force 41A concentrically disposed about axis A. The matching coil 24A for such antenna type is formed with the coil axis B parallel to the axis of wheel 18 so that magnetic force lines 41A pass through the loops of the coil to permit electromagnetic coupling. Another common type antenna comprises a ring-like element 28B, FIG. 1B, concentrically disposed about a projectile axis A and is so fed that it generates a toroidal lobe pattern having elliptical magnetic force lines 41B with an axis of the ellipse in parallel relation to projectile axis A. The matching coil 24B for the latter is formed as a flat spirally wound coil, which is wound about an axis C disposed in tangential relationship to the wheel, to similarly permit electromagnetic coupling.

In matching coils 24 to the particular carrier frequency of the different fuses, the coil is selected to have a frequency of self-resonance nominally equal to the specified carrier frequency of the fuse it matches, and to have a "Q," or resonant quality, which permits it to be excited into resonance in the given energy coupling environment of apparatus 10 if the actual operating frequency of the radio fuse is within limits deemed acceptable for purposes of the test. Accordingly the coil matched to a particular radio fuse appears to its matching fuse as a parallel resonant circuit, as shown schematically in FIG. 2. In accordance with well known principles, self-resonance may be exhibited by an electrically open coil due to the distributed impedance of the coil resulting from the magnetic coupling between individual loops of the coil and distributed capacitances between the separated portions of the conductor. The relative magnitude of these impedances are determined by the size, number, and spacing of the loops of the coil. However, it is important in an understanding of the operation of apparatus to realize that although the radio fuse oscillator 30 and the matching coil are nominally tuned to the same frequency, it is virtually impossible to tune the oscillator and coil to an exact correspondence and that as a practical matter they are tuned to a slightly different frequency.

In operation of apparatus 10, projectile nose section 16 is made inert by substituting a suitable simulated firing indicator 44 for its squib (not shown), and the radio fuse is energized by an external power supply 46 controlled by a switch 48. Wheel 18 is rotated while the radio fuse is energized by closing switch 48. As is generally known, the tuned circuit of an oscillating detector is somewhat unstable or "soft" and if it is sufficiently coupled to an external tuned circuit having a slightly different frequency, it will excite the latter to resonance, and the internal and external resonant circuits will react upon one another to detune or "pull" the internal circuit to operate at a different frequency determined by the impedance reflected by the external resonant circuit back into the internal resonant circuit. After radio fuse 26 is energized, the matching coil carried by wheel 18 acts as such an external circuit when the particular matching coil is rotated from a sector of the fixed angular positions about the axis of spindle 20 remote from the projectile and where there is therefore substantially no inductive coupling in accordance with square-law principles, to a sector of such angular positions adjacent the projectile where there is appreciable inductive coupling. If the frequency of operation of fuse 26 lies within its range of self-resonance, oscillator 30 will be detuned. It has been found that the rotation of wheel 18 causes the oscillator to be abruptly detuned from its own frequency to a finitely different frequency determined by the external coil at a sufficiently rapid rate to affect the operating parameters of oscillator 30 in such manner as to produce a transitory energy pulse of finite duration at the output of heterodyning circuit 36 having waveform as shown by solid curve 50. This pulse is sometimes called a "lock pulse" because the oscillator can be thought of as "locking on" a new frequency. It will be apparent that this pulse resembles the waveform of solid line curve 38. It has been found to be rich in audio frequency components in the range of the Doppler frequencies and therefore passes through the band pass amplifier 40 and effectively simulates a target signal for purposes of operating the selective circuit 42 to initiate a firing pulse, which in turn actuates the simulated firing indicator 44 to show that the carrier frequency of the fuse lies within the acceptable range and that the firing circuit is functioning properly.

Obviously many modifications and variations of the present invention are possible in the light of the above teachings. For example, while the apparatus has been disclosed in connection with testing of a radio fuse which utilizes Doppler phenomena and is intended against a point target, it could be employed to test other types of radio fuses having oscillating detectors, but utilizing the phase change difference of reflected radio waves, or could be employed to test oscillating detector type fuses adapted to explode at a predetermined distance above the ground surface, as will be understood by those skilled in the radio fuse art. It is therefore to be understood that within the scope of the appended claims the invention may be practiced otherwise than as specifically described.

What is claimed is:

1. A method for testing a radio fuse projectile of the type including an oscillator detector connected to a directive antenna element, comprising the steps;
   (a) supporting the projectile in a stationary relationship, and
   (b) moving an electrically open detuning coil along a predetermined path from a first sequential portion of the path to a second sequential portion of the path adjacent the projectile, with a predetermined speed of movement from the first to the second sequential portions of the path, and with the detuning coil in a substantially non-inductively coupled relationship to the electromagnetic field pattern of the antenna element during movement through the first sequential portion of the parth and in inductively coupled relationship to the electromagnetic field pattern of the antenna element during movement through the second sequential portion of the path, said detuning coil having a number, size, and relative spacing of loops matched to the oscillating detector to exhibit resonance of predetermined characteristics tending to react upon the oscillator detector to pull the frequency of operation of the oscillator detector away from its normal operating frequency, said predetermined speed being sufficient to cause the detuning coil to abruptly shift the frequency of operation of the oscillating detector from said normal frequency to a finitely different frequency accompanied by transient pulse of output energy appearing at the output of the oscillating detector, whereby appearance of said transient pulse at the output of the oscillating detector indicates that the oscillating detector is operating within desired frequency tolerance limits.

2. A method in accordance with claim 1 wherein,
   (c) said coil is rotated about an axis of rotation and disposed in an attitude in predetermined relationship to a reference radial line through the coil and the axis of rotation, said first and second sequential portions of the path comprising first and second sectors of the circular path of the coil about the axis of rotation.

3. A method in accordance with claim 1, said fuse projectile being of the type in which the fuse firing stimuli produces a firing signal at the output of the oscillating detector having a predetermined form of variation of energy, which firing signal is coupled to a firing signal selective circuit to fire the projectile,
   (d) said transient pulse having a form simulating said firing signal, and
   (e) the further step of delivering the transient pulse to the firing signal selective circuit to thereby test the proper functioning of the latter.

4. Apparatus for testing a radio fuse projectile of the type including an oscillator detector connected to a directive antenna element, comprising:
   (a) means for supporting the projectile in a stationary relationship, and
   (b) means for moving an electrically open detuning coil along a predetermined path from a first sequential portion of the path to a second sequential portion of the path adjacent the projectile, with a predetermined speed of movement from the first to the second sequential portions of the path, and with the detuning coil in a substantially non-inductively coupled relationship to the electromagnetic field pattern of the antenna element during movement through the first sequential portion of the path and in inductively coupled relationship to the electromagnetic field pattern of the antenna element during movement through the second sequential portion of the path, said detuning coil having a number, size, and relative spacing of loops matched to the oscillating detector to exhibit resonance of predetermined characteristics tending to react upon the oscillator detector to pull the frequency of operation of the oscillator detector away from its normal operating frequency, said predetermined speed being sufficient to cause the detuning coil to abruptly shift the frequency of operation of the oscillating detector from said normal frequency to a finitely different frequency accompanied by transient pulse of output energy appearing at the output of the oscillating detector, whereby appearance of said transient pulse at the output of the oscillating detector indicates that the oscillating detector is operating within desired frequency tolerance limits.

5. Apparatus in accordance with claim 4 wherein,
   (c) said coil is rotated about an axis of rotation and disposed in an attitude in predetermined relationship to a reference radial line through the coil and the axis of rotation, said first and second sequential portions of the path comprising first and second sectors of the circular path of the coil about the axis of rotation.

6. Apparatus in accordance with claim 4, said fuse projectile being of the type in which the fuse firing stimuli produces a firing signal at the output of the oscillating detector having a predetermined form of variation of energy, which firing signal is coupled to a firing signal selective circuit to fire the projectile,
   (d) said transient pulse having a form simulating said firing signal, and
   (e) means for delivering the transient pulse to the firing signal selective circuit to thereby test the proper functioning of the latter.

7. Apparatus for testing any of a predetermined set of specific designs of radio fuse projectiles, said projectiles each being of a type including an oscillator detector connected to a directive antenna element, said apparatus comprising,
   (a) means for removably supporting a projectile made of a low permeability material,
   (b) a rotatable wheel made of a low permeability material,
   (c) a corresponding set of electrically open detuning coils carried by said wheel in angularly spaced relationship along the periphery of the wheel with each coil of the set in an attitude in predetermined relationship to a reference line through the coil and the axis of rotation of the wheel, each coil of said set having a number, size, and relative spacing of the loops matched to the oscillating detector of a corresponding one projectile of the set of specific designs of radio fuse projectile to exhibit resonance of predetermined characteristics tending to react upon the oscillator detector to pull the frequency of operation of the oscillator detector away from its normal operating frequency,
   (d) the construction and arrangement being such that the wheel is rotatable through a first sequential sector of fixed angular positions about the axis of the wheel and through a second sequential sector of fixed angular positions about the axes of the wheel adjacent to the projectile, said coils during their rotation through the first sequential sector being in substantially non-inductively coupled relation to electromagnetic field of the antenna element, and said coils during their rotation through said second sequential sector being in inductively coupled relation to the electromagnetic field of the antenna element,
   (e) means for rotating said wheel at a speed such that when any one of the set of specific designs of projectiles is placed in the removable support means the movement of the corresponding detuning coil from the first sequential sector to the second sequential sector causes an abrupt shift of frequency of operation of the oscillating detector from its normal frequency to a different frequency accompanied by a transient pulse of output energy appearing at the oscillating detector, whereby appearance of said transient pulse indicates that the oscillating detector is operating within desired tolerance limits.

8. Apparatus in accordance with claim 7 wherein said set of specific designs of radio fuse projectiles includes a first specific design having a directive antenna element of the type providing a predetermined pattern of isometric field intensity lines having a torroidal shape about a toroid axes co-aligned with the projectile axis, and a second specific design having a directive antenna element of the type providing a predetermined pattern of isometric field intensity lines having a concentric ring-like shape about the projectile axis,
   (f) said set of coils including a first coil of flat spiral form carried by the wheel in a plane including the wheel axis and a second coil of generally helical form which progressively winds in a direction along the axis of the helix carried by the wheel with the axis of the helix in a plane including the wheel axis, said first and second coils corresponding to one and the other of the first and second specific designs of projectile and inductively coupled thereto through their respective predetermined pattern of isometric field intensity lines.

References Cited by the Examiner
UNITED STATES PATENTS

| | | | |
|---|---|---|---|
| 2,448,889 | 9/48 | Johnson et al. | 343—7 |
| 2,683,855 | 7/54 | Blitz | 343—17.7 |
| 2,715,725 | 8/55 | Jackson | 343—7 |
| 2,774,060 | 12/56 | Thompson | 340—258 |
| 2,977,590 | 3/61 | Lovick | 343—17.7 |

CHESTER L. JUSTUS, *Primary Examiner.*